United States Patent [19]

Duddy et al.

[11] 4,035,556

[45] July 12, 1977

[54] LEAD BASE ALLOY FOR USE IN A STORAGE BATTERY GRID

[75] Inventors: Joseph C. Duddy, Trevose; Edward R. Hein, Doylestown, both of Pa.

[73] Assignee: ESB Incorporated, Philadelphia, Pa.

[21] Appl. No.: 241,914

[22] Filed: Apr. 7, 1972

Related U.S. Application Data

[63] Continuation of Ser. No. 135,922, April 21, 1971.

[51] Int. Cl.² .......................................... H01M 4/66
[52] U.S. Cl. ............................ 429/245; 75/166 D
[58] Field of Search ...................... 136/65; 75/166 D

[56] References Cited

U.S. PATENT DOCUMENTS

| | | | |
|---|---|---|---|
| 909,869 | 1/1909 | Clamer | 75/166 D |
| 1,186,217 | 6/1916 | Mark et al. | 75/166 D |
| 1,333,237 | 3/1920 | Ayala | 75/166 D |
| 1,447,781 | 3/1923 | Holland et al. | 75/166 |
| 1,939,667 | 12/1933 | Csanyi | 75/166 D |
| 2,097,274 | 10/1937 | Fields | 75/166 D |
| 2,439,068 | 4/1948 | Worrall | 75/166/166 D |
| 3,355,285 | 11/1967 | Harvey | 75/166 D |

FOREIGN PATENT DOCUMENTS

| | | | |
|---|---|---|---|
| 442,558 | 2/1936 | United Kingdom | 429/226 |

OTHER PUBLICATIONS

Metals Handbook, vol. 1, pp. 1065, 1066, 1961.

*Primary Examiner*—C. F. LeFevour
*Attorney, Agent, or Firm*—Anthony J. Ross; Gary V. Pack

[57] ABSTRACT

A unique alloy comprising lead with small additions of zinc and tin is used to make grids for lead acid cells. The alloy as produced is softer than is desirable. It is hardened by mechanical working. When properly worked, it has a strength and stiffness approaching that of other low alloy lead materials currently in use as storage battery grids.

2 Claims, 4 Drawing Figures

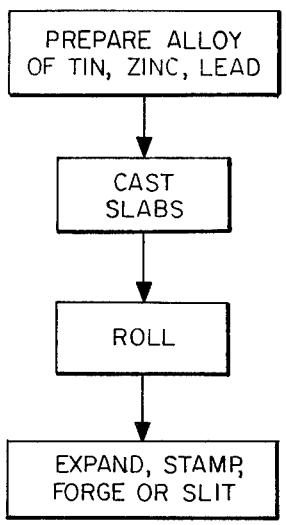
Fig. 1
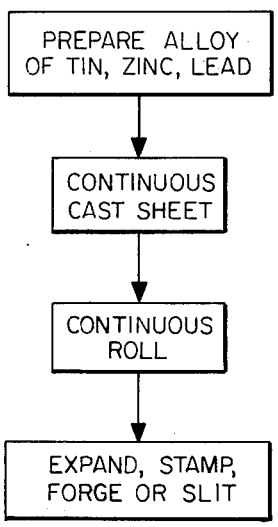
Fig. 2
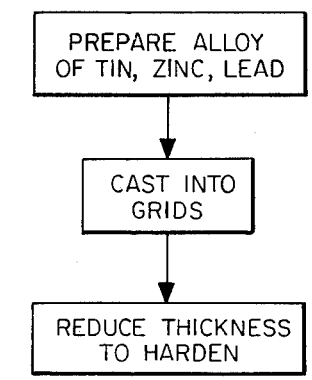
Fig. 4
Fig. 3
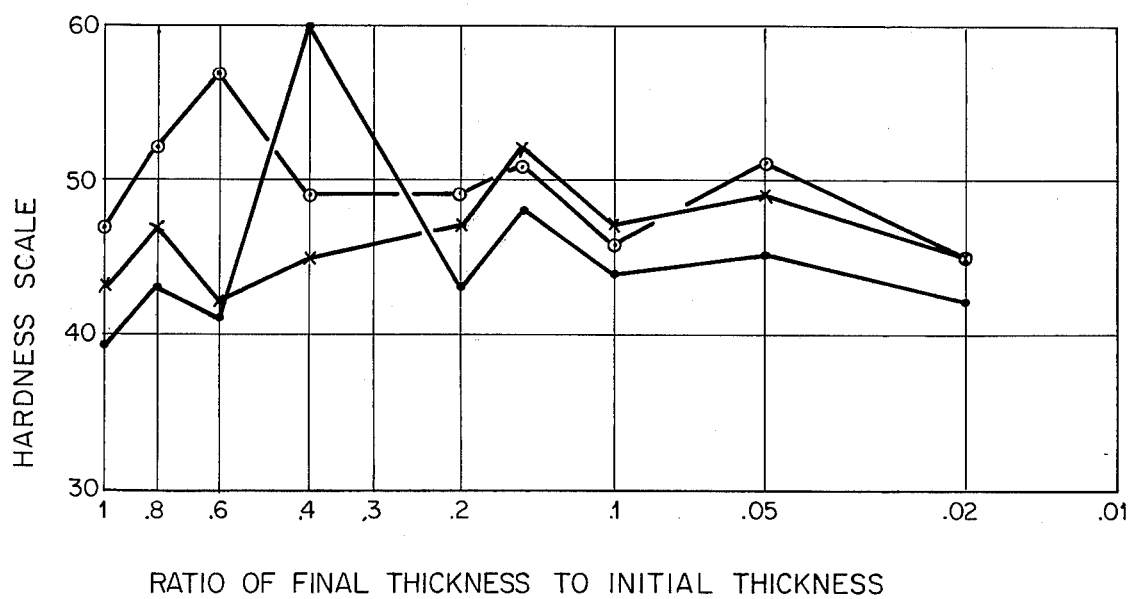
RATIO OF FINAL THICKNESS TO INITIAL THICKNESS
INVENTORS.
JOSEPH C. DUDDY
EDWARD R. HEIN

LEAD BASE ALLOY FOR USE IN A STORAGE BATTERY GRID

CROSS REFERENCES

This application is a continuation of application Ser. No. 135,922 filed Apr. 21, 1971.

BACKGROUND OF THE INVENTION

1. Field of the Invention

This invention relates to lead acid storage batteries. In particular, it relates to a composition of matter useful for the grids of such batteries.

2. Description of the Prior Art

The basic structural material from which the vitals of lead acid storage batteries are built is lead. Pure lead is a very soft and ductile material. From the beginning of the storage battery industry, ways have been sought to increase the strength and the stiffness of lead so as to improve the battery and to permit its manufacture by mechanical means. Antimony added to lead has a remarkable strengthening effect. It is the classical lead hardening agent and lead antimony alloys have been almost universally used for battery parts. Unfortunately, antimony has also been found to be a sort of chemical poison for lead acid storage batteries.

The deleterious effects of antimony are well documented as are the efforts of the storage battery industry to find alloys that have strength approaching the antimony alloys without the deleterious side effects. A great many alloys of lead have been made and tested for use in storage batteries. At least 14 elements from the Periodic Table have been used to alloy with lead either as binary, tertiary or quaternary alloys. One such alloy consists of lead plus a small quantity of calcium. This alloy, though not as strong as the lead antimony alloys, is strong enough to meet many requirements and is completely free of any poisoning effects. Lead calcium alloys therefore are assuming increasing importance in the storage battery industry. Unfortunately, this alloy has some faults of its own. It is a difficult material to cast and in order to fill out a mold, the metal must be handled at high temperatures. Under high temperature conditions, the calcium rapidly oxidizes from the molten metal and thus careful controls are required to maintain the metal composition. Moreover, it has been found that lead calcium alloys are subject to a form of intergrannular corrosion when subjected to the conditions found in the positive grid of a storage battery. Because of this, batteries using lead calcium grid alloy often do not give as long a life as they should from theory. Often it is found that a lead antimony cell in practice will give as good life as the lead calcium. It has been found that the size of the grains found in lead calcium alloy castings relates to the corrosion effect and the industry tries to control the grain size although this is a difficult and expensive producing exercise.

Lead zinc tin alloys are known as soldering material for aluminum as well as a coating material for steel.

SUMMARY OF THE INVENTION

A lead alloy containing tin and zinc mechanically worked after casting is disclosed. An optimum range of 0.5 to 2% zinc and 0.05 to 2.% tin has been determined. The degree of mechanical work requires control as overworking weakens the material. Process steps for manufacturing storage battery grids making use of the alloy of the invention are also listed. This treated alloy has adequate strength for storage battery use, is free from the chemical faults of antimony lead alloys and does not exhibit the metallurgical weaknesses of calcium lead alloys. The alloy can also be cast directly into battery grids and stiffened if desired by a modest working operation on the casting.

BRIEF DESCRIPTION OF THE DRAWINGS

FIG. 1 illustrates in block form a first embodiment of the invention;

FIG. 2 illustrates in the same manner a second embodiment;

FIG. 3 illustrates in graphic form the results of working the metal of the invention; and FIG. 4 illustrates a third embodiment.

DESCRIPTION OF THE PREFERRED EMBODIMENTS

Lead is alloyed in the molten state with tin and zinc to form an alloy having 0.5 to 2% zinc and 0.5 to 2% tin. In a first process, FIG. 1, individual ingots of the material are cast in a size suitable for rolling. The ingots are then rolled out into sheets. The sheet material is further manipulated to form finished storage battery grids by any of several known means. Among the methods for producing battery plates from sheet material that have been practiced are:

a. slitting and expanding to form an open grid,
b. punching out an open grid,
c. forging an interlocked type of grid,
d. combinations of a) or b) with c).

It is to be noted that methods (a) and (b) above do not add additional working to the metal, methods (c) and (d) do. It has been determined that the hardness of the alloy is dependent upon the degree of working that the alloy receives. Therefore, in the cases of (a) or (b), the initial rolling process will include greater reductions than (c) or (d) in order to get the same total degree of working.

FIG. 2 shows in block form a continuous method for producing battery grids using alloys of the invention. The processes of FIG. 2 differ from FIG. 1 only in the use of continuous equipment rather than batch equipment.

A continuous strip of alloy is cast and continuously rolled out to final thickness. The strip then passes through grid forming operations as described above.

FIG. 3 shows in graphic form the results of a series of tests to determine the desired degree of working (in terms of the ratio of final thickness to initial thickness of a slab of material in a rolling mill) of three lead tin zinc alloys. The absicissa of the curve is in logarithmic coordinates to indicate its repetitive nature of the reduction operation. It is to be noted that the hardness varies in a more or less cyclical way and that there appears to be more than one peak and one valley in each curve. There is a scientific basis for this behavior. The mechanism by which the hardness of tha alloys of this invention is produced is one of dispersion hardening.

Without a hardening agent, lead solidifies into grains made up of a very uniform lattice. Because of the shape of the lattice crystals, there are numerous cleavage planes along which slippage can readily occur when the grain is stressed. For this reason, pure lead is an extremely soft material having almost no elasticity. When certain foreign atoms are added to lead, they form bumps or protuberances in the cleavage planes and tend to prevent the easy slippage of platelets of metal in the grain. Atoms which produce this effect are known as dispersion hardening agents. A comparatively small addition of such agents can cause a remarkable increase in hardness of the metal. Dispersion hardening agents are often not very soluble in the base metal so that limits on the amount that can be added are set by natural causes. This is true of the lead-zinc system and the total amount of zinc with which lead can be alloyed is approximately 2%.

When certain non-antimony lead alloys are used for battery grids, and when the batteries containing such grids are fully discharged, it has been found that the grids passivate. A non-conducting layer appears on the grid surface and when the battery is recharged, the charge voltage rises to perhaps 10 times the normal charge voltage. Charge voltages of this magnitude cannot be handled by most normal charging equipment and when the phenomenon occurs, the battery must be discarded. It has been found that the addition of some tin to the alloy prevents the formation of the non-conductive layer on the lead grid. Therefore, it is desirable to include some tin in the alloy of the invention. It is to be understood that although the tin has some hardening effect, the principal reason for including it in the alloy of the invention is for electrochemical reasons.

When a dispersion hardened alloy is worked, the locking effect of the foreign atoms is increased until a point comes where the strength of the material is exceeded. At this point, the alloy rapidly recrystallizes and its strength drops back to approximately the original strength in the unworked state. With further working, the effect repeats itself. Thus, the strength (or hardness) vs. degree of working curve should show a series of sawtooth shaped peaks. This is reflected in the curves of FIG. 3.

In FIG. 3 insufficient points were taken to really show the sawtooth effect. However, the curve clearly illustrates the cyclical nature of the work hardening effect. It is believed that additional testing will disclose peaks as high or higher than the initial peaks located in FIG. 3. It is to be noted that the hardness of all the alloys tested can be brought to a value of at least 50 by the work hardening operation.

By working is meant mechanical plastic deformation of the metal at room temperature or below. It can be measured for example, by the reduction in thickness of the metal caused by a forging, pressing or rolling operation. The degree of reduction vs. hardness is a more or less absolute relationship and is independent of the means by which the reduction is produced, with one exception. The hardness of a metal due to a given reduction is also dependent on the temperature at the time of reduction. It is, unfortunately, difficult if not impossible to determine this temperature. Therefore, when using the percent reduction as an indication of hardness, the reduction must be done slowly so as not to heat the metal, or the means by which the reduction is made must be qualified.

As point out above, pure lead and even its alloys are very soft materials. There seems to be no presently accepted standard hardness scale that is really suitable for use with lead and its alloys. In the study of lead-zinc alloy, an arbitrary standard has been set up. A standard penetration type hardness tester (Rockwell Superficial Hardness Tester) is fitted with a steel penetration ball of 0.500 inch diameter and a major load of 15 KG is applied. The readings used in FIG. 2 were taken under the conditions outlined above.

The following tabulation gives a comparison of the hardness of the lead, tin, zinc alloy with certain other known lead alloys:

|  | Hardness Units |
|---|---|
| Lead, 1.5% Zinc, 1.5% Sn |  |
| as cast | 48 |
| 24 hours later | 47 |
| 100 hours later | 47 |
| best work hardened | 60 |
| Pure lead (depending upon purity) | −20 to −2 |
| Lead, 1.5% Sn | 18 to 26 |
| Lead, .08 calcium, 1% Sn |  |
| as cast | 15 |
| 2 days | 47 |
| 5 days | 57 |
| 1 year | 73 |
| Lead, 6.0% Sb | 77 to 80 |

From this tabulation, it is seen that the initial strength of the new alloy is considerably greater than the initial strength of lead calcium alloy but that the calcium alloy rapidly age hardens to a value somewhat greater than has been found with the new alloy even when subjected to optimum working. The new alloy does not age harden to any great extent. Other testing indicates that neither heat treatment nor quenching increase the hardness of the alloy of the invention.

It has been found that the new alloy is readily formed and flows well into mold cavities. Because of its high initial strength compared to pure lead or lead calcium alloy, it is easily removed from a mold after casting. Also, it is easily trimmed of casting flashes, etc. Thus, it is a good material for cast grids except that its hardness is somewhat low. However, it has been found that a superficial treatment in a rolling mill (5 to 20% reduction) hardens the surface of the grid and renders it more suitable for mechanical battery assembly. The hardening effect can also be produced by pressing the grids between flat plattens or other means.

FIG. 4 illustrates in block form a process using cast grids. It is seen that the grids are hardened by subjecting them to a reduction operation of 5 to 20% in thickness. This degree of working is sufficient to stiffen the grid without undue distortion. They are then ready for further processing using classical battery plate machinery.

Example. A lead alloy containing 1.5% zinc and 1.0% tin was used to cast automotive battery type grids. These were processed into positive and negative plates by conventional processing steps and then assembled into cells. The cells were tested for capacity and cycle life as follows:

| | |
|---|---|
| Initial capacity at 20 Hr rate | 72 AH |
| Charge voltage at 30 amperes | 2.78 volts per cell |
| Capacity at 20 Hr rate after 2 weeks stand at 95° F. | 69.7 AH |
| Capacity at 150 amperes: 0° F. | 8.3 min. |
| Cycle Test, 4 hours charge at 6 amps 2 hours discharge at 10 amps at 61 cycles | |
| capacity at 150 amperes 0° F. | 8.5 min. |
| at 210 cycles | |
| capacity at 150 amperes 0° F. | 6.5 min. |
| at 325 cycles | |
| capacity at 150 amperes 0° F. | 3.1 min. |
| Charge Voltage at 325 cycles | 2.75 volts |

From this testing, it can be stated that the new alloy gives the desirable high charge voltage during cycle life found with lead-calcium alloys and considerable better than antimony alloys (one would expect a charge voltage of, say, 2.50 volts at 325 cycles). The life on cycle test is comparable to calcium alloy life but shorter than expected cycle life for antimony alloys (500 cycles).

While the disclosure thus far has dealt with the use of the invention as a lead acid storage battery grid, it is also suitable for use in other lead parts making up a storage battery. In many storage battery constructions, the battery plates are welded onto metal pieces called straps. The straps serve to support the plates and carry the electric current from the plates to a part of the straps called the post. The post leads through the battery cover and is often connected by welding to parts called intercell connectors or to other parts called terminals. In order to keep corrosion to a minimum, it is desirable to have the several metal parts that are welded together made from a single alloy. Therefore, the use of the alloy of the invention includes its use in straps, posts, intercell connectors and terminals as well as in battery grids.

Having fully described our invention and given examples of its utilization for the manufacture of storage battery grids, we claim:

1. A lead base alloy for use in a storage battery grid comprising essentially from about 0.5 to 2% zinc, about 0.5% to about 2% tin, the balance lead and having a hardness when tested in a superficial hardness tester with a steel penetration ball 0.500 inch in diameter and a major load of 15 kilograms of at least 50.

2. A lead base alloy as defined in claim 1 wherein the quantity of zinc in the alloy is essentially from about 0.7% to about 1.9% and the amount of tin is essentially from about 0.5% to about 1.2%.

* * * * *